United States Patent [19]
Gillespie

[11] 3,762,956
[45] Oct. 2, 1973

[54] ELECTROCHEMICAL CELLS

[75] Inventor: Peter James Gillespie, Hampshire, Basingstoke, England

[73] Assignee: Energy Conversion Limited, London, England

[22] Filed: Dec. 1, 1970

[21] Appl. No.: 94,009

[30] Foreign Application Priority Data
Dec. 3, 1969 Great Britain ............... 58,918/69

[52] U.S. Cl. ........................... 136/86 A, 136/133
[51] Int. Cl. .......................................... H01m 1/02
[58] Field of Search ............... 136/86 A, 133, 136

[56] References Cited
UNITED STATES PATENTS

| | | | |
|---|---|---|---|
| 2,848,525 | 8/1958 | Schumacher et al. | 136/136 |
| 2,759,038 | 8/1956 | Marsal | 136/136 |
| 2,103,714 | 12/1937 | Drummond | 136/133 |
| 2,026,615 | 1/1936 | Corigliano et al. | 136/133 |

Primary Examiner—Donald L. Walton
Attorney—Morgan, Finnegan, Durham & Pine

[57] ABSTRACT

Gas depolarized cell which includes a vent to allow the pressures interior and exterior of the cell to equalize. The vent comprises an aperture or volume closed by electrolyte-phobic, gas permeable material. This material is preferably a portion of the cathode of the cell. End cap crimping arrangements are also provided for sealing the ends of the cell.

9 Claims, 4 Drawing Figures

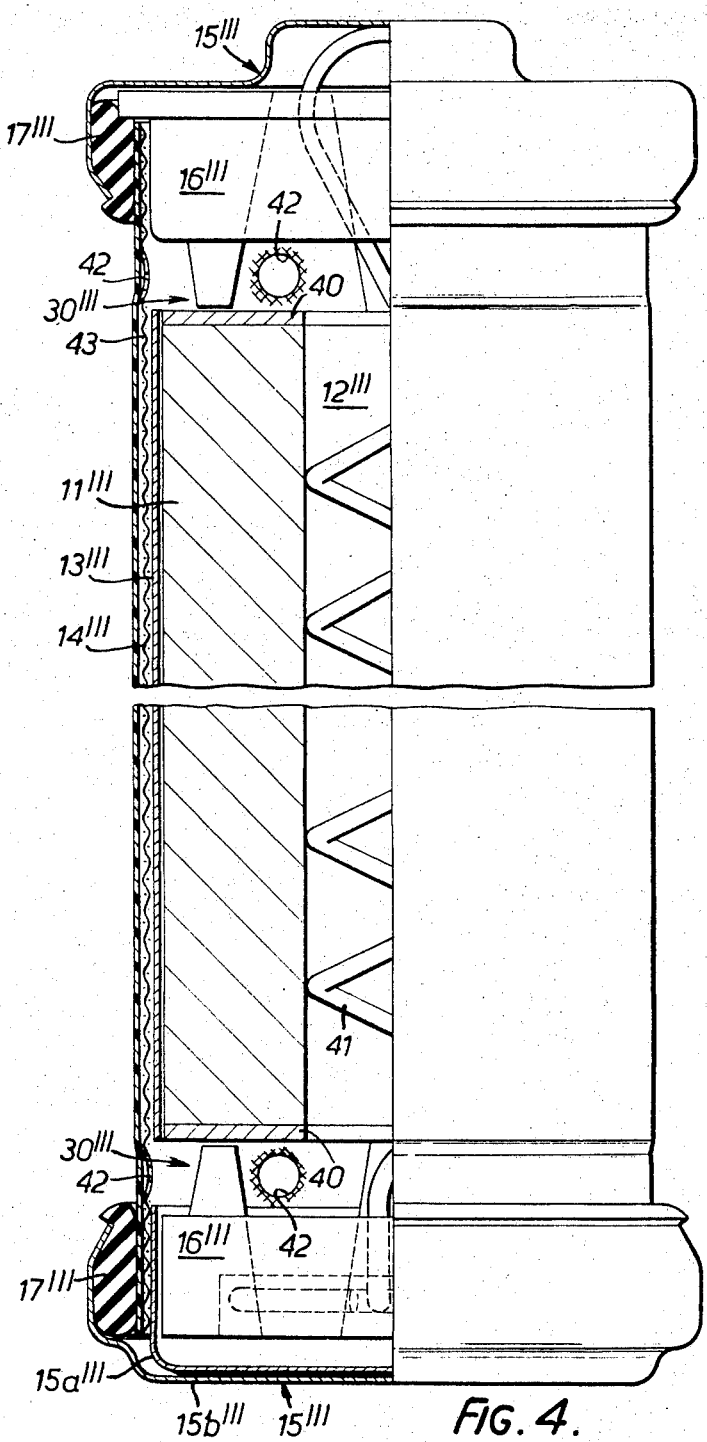

ELECTROCHEMICAL CELLS

The invention relates to electrochemical cells and more particularly to gas depolarized cells.

According to one aspect of the invention, a gas depolarized cell includes a vent to allow the pressures interior and exterior of the cell to equalize, said vent comprising an aperture or volume closed by electrolyte-phobic gas permeable material.

According to a further aspect of the invention a gas depolarized cell comprises an anode electrode aperture to contain electrolyte for the cell and an electrolyte-phobic cathode electrode surrounding the anode electrode, the whole arrangement being such that whatever the physical attitude of the cell a portion of at least the electrolyte-phobic material of the cathode is available to a gas space within the cell to allow gas pressures interior and exterior of the cell to equalize.

According to a still further aspect of the invention a gas depolarized cell comprises a tubular anode which is apertured to provide an electrolyte reservoir, a tubular cathode electrode formed of electrolyte-phobic material which extends beyond the anode at each end thereof to respective end caps and a predetermined volume of liquid electrolyte which does not completely fill the interior of the cell, whereby at least one or portions of said cathode extension portions are free of electrolyte to allow unwanted gases within the cell to vent to the exterior of the cell and to allow gas pressures interior and exterior of the cell to equalize.

According to yet a further aspect of the invention there is provided a gas depolarized cell including at least one end cap for the cell having a circumferentially extending member or flange portion which acts as a backing member abutted by one end of a tubular cathode electrode, a seal being located around said end of the cathode and an outer circumferential lip portion of the end cap being crimped or otherwise turned over the seal to force said end of the cathode electrode against said member or flange portion.

Preferably the cathode electrode is cylindrical.

Said circumferentially extending member may comprise an annular member formed of an electrically insulating material such as a synthetic plastics. In this arrangement an electrically conductive member or portion may extend from the end cap to an anode electrode of the cell to both electrically connect it to and mechanically position it with respect to the end cap. A foraminated metal outer casing may be crimped or otherwise attached to the end cap, either directly or with electrically insulating material interposed therebetween.

Alternatively, the flange comprising the backing member may be integrally formed of the electrically conductive material of the end cap or by a separate member of electrically conductive material abutting and possibly fixed to the end cap. In this arrangement a member of electrically insulating material is provided to locate the anode electrode with respect to the end cap of the cell. The foraminated metal outer casing may be crimped or otherwise attached to the end cap with an electrically insulating spacer interposed therebetween.

The cell may have an end cap as defined by the next preceding paragraph at one end thereof and an end cap as defined by the next but one preceding paragraph at the other end thereof, such end caps providing the respective terminals for the cells.

According to a still further aspect of the invention an outer casing for a gas depolarised cell comprises a tubular, foraminated member with a tear-off portion carried thereon, said portion closing the apertures of the foraminated member whilst carried thereon.

The outer casing may be adapted to be crimped or otherwise fixed, for example by heat shrinking, between the end caps of a cell or battery of cells.

The tear-off portion may comprise a sheet of plastics material of the so-called self-adhesive type or tube of plastics material of the so-called heat shrinking type.

Such an outer casing may be utilized with a cell as hereinbefore defined in the second to sixth paragraphs inclusive.

The foregoing and further features of the invention may be more readily understood from the following description of some preferred embodiments thereof, by way of example, with reference to the accompanying drawing, in which:

FIG. 4 is a side elevational view, part in section, of a cylindrical gas depolarized primary cell.

Figure 1:
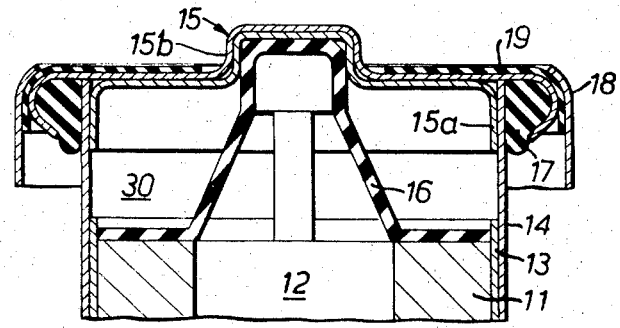
FIG. 1 is a side sectional view of one end of a cylindrical gas depolarized primary cell.

Referring now particularly to FIG. 1 of the drawing there is shown a side sectional view of one end of a gas depolarized primary cell, such as a metal (e.g. zinc-)/oxygen (e.g. air) cell, illustrating an end cap connection in which the end cap acts as the positive terminal of the cell, i.e., is connected to the cathode electrode.

The cell comprises a cylindrical, porous anode electrode 11 formed with a central aperture 12 which serves as a reservoir for electrolyte which may be an aqueous solution of potassium hydroxide. Around the anode 11 is wrapped an electrolyte pervious separator 13 which spaces the anode 11 from a cathode electrode 14 which extends around the separator 13.

The end cap is generally indicated at 15 and comprises an inner generally cup-shaped metal portion 15a and an outer generally cup-shaped metal portion 15b. Both portions 15a and 15b have central nose parts which interengage and are spot welded together. An electrically insulating spacer 16 engages within the nose part of inner portion 15a and serves to space the anode 11 from the end cap 15.

The inner portion 15a is formed at its periphery with an inwardly directed rim which forms a backing member against which the end of the cathode 14 engages. An O-ring seal 17 surrounds the cathode 14 where it engages the backing member and the outer periphery of the outer portion 15b is crimped or otherwise turned over around the seal ring 17 to squash it and the end of the cathode 14 against the backing member.

A foraminous, metal outer casing 18 has its end crimped or turned over the crimped outer periphery of outer portion 15b with an electrically insulating spacer 19 interposed therebetween.

It should be noted that the cathode 14 is rigidly connected to the end cap 15 so no further electrical connectin is required.

The electrolyte (not shown) for the cell is arranged to have a volume which does not fill the cell so that unwanted gas generated in the cell or pressure build-ups are allowed to vent through the portion of the cathode 14 which extends between the anode 11 and the end cap 15 in volume 30.

The cathode structure does not form a part of this invention so is not further described. However, a suitable cathode structure is fully described in copending U.S. patent application, filed Apr. 21, 1969, Ser. No. 817,940, now abandoned. The hydrophobic material is alone extended between the anode 11 and end cap 15.

Figure 2:
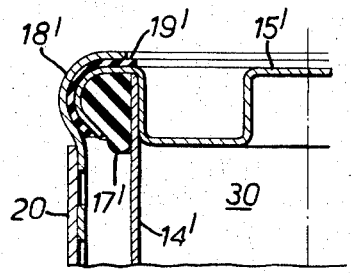
FIG. 2 is a side sectional view of half of one end of a cylindrical gas depolarized primary cell.

Referring now to FIG. 2 there is shown a similar cell end cap arrangement to that shown in FIG. 1 excep that the inner and outer portions 15a and 15b are replaced by a single member 15, which is shaped to form the backing member portion for the crimping of the assembly. Further this arrangement also illustrates a tear-off protective member 20 fixed around the foraminous outer casing 18'. The member 20 may be a plastics sheet of the so-called self-adhesive type, or a tube of heat shrinkable plastics, and serves to prevent air from entering to the cathode 14' until the cell is required for use.

Figure 3:
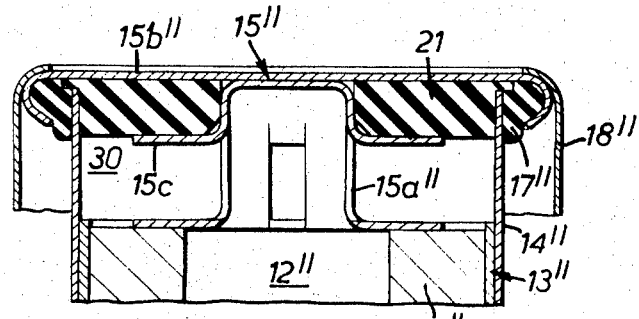
FIG. 3 is a side sectional view of one end of a cylindrical gas depolarized primary cell.

Referring now to FIG. 3 there is shown a side sectional view of one end of a gas depolarized primary cell, such as a metal (e.g. zinc)/oxygen (e.g. air) cell, illustrating an end cap connection in which the end cap acts as the negative terminal of the cell i.e., is connected to the anode.

The electrode arrangement of this cell is identical to that described for FIG. 1.

The end cap 15'' again comprises an inner portion 15a'' and an outer portion 15b'', but the outer portion 15b'' does not have a nose part. The inner portion 15a'' in this cell serves to space the anode 11'' from the end of the cell and since it directly contacts the anode 11'' obviates the need for any further electrical connection to it. Tabs 15c are bent from the inner portion 15a'' to support an electrically insulating spacer 21 which serves to insualte the cathode 14'' from the end cap 15'' and serves as the backing member for the crimping. Apart from the fact that no electrical insulation is required between the outer case 18'' and the crimped rim of outer portion 15b'' the remainder of this arrangement is identical to that of FIG. 1.

A primary cell may be provided with an end cap arrangement as shown in FIGS. 1 or 2 at one end and an end cap arrangement as shown in FIG. 3 at the other end. It should be realized that with such an arrangement any unwanted gases in the cell will be satisfactorily vented to the atmosphere irrespective of the physical orientation of the cell.

Referring now to FIG. 4 there is shown a full primary cell with an end cap at the bottom similar to that of FIG. 1 and an end cap at the top similar to that of FIG. 3. In this arrangement a spacer 16''' of electrically insulating material is used at the top end cap as the backing member for the end of the cathode 14'''. At the bottom the spacer 16''' merely acts as a spacer and cup 15a''' acts as a backing member. Each spacer 16''' comprises an annular portion with three legs which abut a retaining disc 40, one at each end of anode 11'''. A current collector, such as the spiral conductor 41, for the anode, is located in the bottom spacer 16''' and passes through the anode 11''' in contact with its inner surface, through upper spacer 16''' and is soldered or otherwise fixed to the upper end cap 15'''. Alternatively a straight blade of springy electrically conductive material may be attached to the end cap 15''' and driven into the anode aperture to provide current collection.

Apertures 43 may be formed in a current collector mesh 43 of the cathode 14''' around the volume 30''' so that the hydrophobic material of the cathode 14''' does not become weted by the electrolyte and so prevent venting of gases therethrough.

In this specification the term "foraminated" member is intended to include a porous member in which the pores are interconnected.

The end cap arrangements and venting described and illustrate herein could advantageously be utilized with the cells described in our copending United Kingdom patent application No. 26600/69, now U.S. Pat. No. 1,256,419.

I claim:
1. A gas depolarized cell comprising:
   a. at least one end cap for the cell, the end cap having associated therewith an annular member providing a support surface,
   b. a cathode electrode, which cathode at one end abuts the support surface of the annular member, said support surface providing a backing member therefor;
   c. a seal, the seal being located around said one end of the cathode, and
   d. an outer circumferential lip formed on the end cap, the lip overlying the cathode and being laterally compressed against the seal to force said one end of the cathode against the support surface of said annular member.

2. A cell as claimed in claim 1 wherein the cathode electrode is cylindrical.

3. A cell as claimed in claim 2 wherein said annular member is comprised of electrically insulating material.

4. A cell as claimed in claim 3, further comprising an anode electrode at the interior of the cathode and an electrically conductive member extending from the end cap to the anode electrode of the cell to both electrically connect it to and mechanically position it with respect to the end cap.

5. A cell as claimed in claim 2 wherein a foraminated metal outer casing is attached to the end cap.

6. A cell as claimed in claim 2 wherein the annular member is integrally formed of electrically conductive material associated with the end cap.

7. A cell as claimed in claim 6 further comprising an anode electrode and a member of electrically insulating material disposed intermediate the anode electrode and the end cap and structurally locating the anode electrode within the cell.

8. A cell as claimed in claim 6 wherein a foraminated metal outer casing is attached to the end cap with an electrically insulating spacer interposed therebetween.

9. A cell as claimed in claim 1, further comprising an anode having an aperture therein and a current collector for the anode including a member of resilient electrically conductive material driven into the aperture of the anode to be engaged therein and extending to the end cap.

* * * * *